United States Patent [19]
Beck

[11] Patent Number: 5,389,389
[45] Date of Patent: Feb. 14, 1995

[54] COMPOSITIONS AND METHODS FOR INHIBITING BROWNING OF PROCESSED PRODUCE

[75] Inventor: Roderick G. Beck, King City, Calif.

[73] Assignee: Basic American Foods, San Francisco, Calif.

[21] Appl. No.: 733,951

[22] Filed: Mar. 14, 1991

Related U.S. Application Data

[63] Continuation of Ser. No. 193,723, May 13, 1988, abandoned.

[51] Int. Cl.$^6$ .............................................. A23B 7/02
[52] U.S. Cl. ................................... 426/269; 426/637
[58] Field of Search ............... 426/269, 637, 259, 310, 426/615

[56] References Cited

U.S. PATENT DOCUMENTS

| | | | |
|---|---|---|---|
| 2,011,465 | 2/1934 | Balls et al. | 426/269 |
| 2,241,436 | 5/1941 | Williams | 426/259 |
| 2,475,838 | 7/1949 | Johnson et al. | |
| 2,620,277 | 12/1952 | Scalera | |
| 2,628,905 | 2/1953 | Antle | 426/268 |
| 2,857,282 | 10/1958 | Jansen | |
| 2,860,055 | 11/1958 | Jansen | |
| 2,874,059 | 2/1959 | Powers et al. | |
| 2,890,120 | 6/1959 | Makower | |
| 2,893,878 | 7/1959 | Simon et al. | |
| 3,027,264 | 3/1962 | Irmiter et al. | |
| 3,049,427 | 8/1962 | Fellers et al. | |
| 3,214,276 | 10/1965 | Sakakibara et al. | |
| 3,220,857 | 11/1965 | Hollis, Jr. et al. | |
| 3,261,695 | 7/1966 | Sienkiewicz et al. | 426/259 |
| 3,305,366 | 2/1967 | Sutton | 426/615 |
| 3,343,970 | 9/1967 | Pader | 426/637 |
| 3,352,691 | 11/1967 | Li | 426/269 |
| 3,552,978 | 1/1971 | Inklaar | |
| 3,574,643 | 4/1971 | Lewis | 426/637 |
| 3,637,772 | 1/1972 | Klaui et al. | |
| 3,681,088 | 8/1972 | Katz et al. | |
| 3,851,078 | 11/1974 | Khayat et al. | |
| 3,895,119 | 7/1975 | Grom | 426/310 |
| 3,952,115 | 4/1976 | Damico et al. | 426/615 |
| 3,968,260 | 7/1976 | Shatila et al. | |
| 3,987,208 | 10/1976 | Rahman et al. | |
| 4,011,348 | 3/1977 | Farrier et al. | 426/615 |
| 4,097,612 | 6/1978 | Powrie et al. | |
| 4,218,487 | 8/1980 | Jaeggi | |
| 4,241,094 | 12/1980 | O'Neil et al. | 426/637 |
| 5,126,153 | 6/1992 | Beck | 426/637 |

FOREIGN PATENT DOCUMENTS 2057355  8/1969  France .................................. 426/269

OTHER PUBLICATIONS

P. M. Simmons; "Measures Color Objectively"; *Food Engineering*, Apr. 1966, (reprint-2 pages).
Talburt & Smith, *Potato Processing*, 4th Ed; Avi Publishing Co; pp. 444, 445, 476, 477, 486, 487.
Smith & Davis; "Prevention of Graying in Dehydrated Potato Products"; *Potato Chipper*, Nov. 1961 (reprint-4 pages).
Braverman, *Introduction to the Biochemistry of Foods* (Elsevier Publishing Co., New York 1963 pp. 246–247).
Furice 1168 Handbood of Food Additives The Chemical Rubber Co. Cleveland Ohio pp. 128–129.
Ahmad 1983 JAOCS 60(2)468.
Muneta 1981 Am. Pat J. 58–85.
Reitmeier 1975 Arkansas Firm Research 24(1) 12.
Peterson 1978 Encyclopedia of Food Science AVI Publishing Co. Inc. Westport Ct. pp. 713–714.

*Primary Examiner*—Carolyn Paden
*Attorney, Agent, or Firm*—Henderson & Sturm

[57] ABSTRACT

Methods for treating produce to minimize browning upon subsequent processing, handling and/or storage wherein the processing involves exposing produce, such as fruits, vegetables and tubers, and particularly potatoes, to discoloration inhibitors including cysteine, calcium chloride, sodium acid pyrophosphate and/or a sulfiting agent in synergistic amounts so as to result with a treated product containing less than about 30 ppm sulfite, and preferably less than about 10 ppm or essentially no sulfite, which may be stored for extended periods of time without exhibiting browning which would otherwise occur unless the produce were treated to have a sulfite content substantially greater than 30 ppm. Dehydrated, storage stable produce containing less than about 30 ppm sulfite, and preferably less than about 10 ppm or essentially no sulfite.

56 Claims, 1 Drawing Sheet

COMPOSITIONS AND METHODS FOR INHIBITING BROWNING OF PROCESSED PRODUCE

This is a continuation of application Ser. No. 07/193,723, filed May 13, 1988, now abandoned.

BACKGROUND OF THE INVENTION

1. Field of the Invention

The present invention is directed to compositions and methods for treating produce to inhibit and eliminate browning reactions. In particular, the present invention is directed to compositions and methods for treating produce with a synergistic composition including cysteine to inhibit enzymatic and non-enzymatic browning reactions during the processing of produce.

2. Discussion of Background and Material Information

As is well known in the food industry, most produce, i.e., fruits and vegetables, such as potatoes, and particularly dehydrated potatoes, have a pronounced tendency to discolor to a grayish-brown upon prolonged periods of storage. This discoloration phenomenon is commonly referred to as a "browning reaction". Although the discolored produce is neither toxic, nor lacking in nutritive value, the discoloration nevertheless gives the produce an objectionable appearance and flavor which makes the produce unacceptable to a majority of prospective consumers. The various causes for browning reactions have been the object of considerable study over the years, and it is generally agreed that there are two primary reactions responsible for such discoloration of produce, i.e., enzymatic action, and certain non-enzymatic processes.

With respect to the former, i.e., enzymatic browning, it is believed that the deleterious changes manifested in stored produce are attributed to various chemical reactions catalyzed by the enzymes naturally present in the plant material. Typically, most fruits and vegetables are subjected to various processing techniques wherein they are subjected to disorganization of their natural structure, as by peeling, cutting, comminuting, pitting, pulping, freezing and dehydrating. As a result, the produce tends to suffer deteriorative changes including the development of dark and unnatural colors, because the disorganization of the natural structure disrupts the natural segregation of substrates and enzymes, and thus permits the enzymes to contact various substrates with the previously-mentioned results.

In general, for these reactions to occur in fruits and vegetables, there must be sufficient enzyme, substrate and oxygen. Certain fruits, such as kiwi fruit and sunbeam peach, do not tend to brown because they have no substrate. Cantaloupe and oranges do not brown because of low enzyme activity at the pH of these fruits. The browning in avocados is believed to be controlled by their phenolase activities.

In potato processing, it has been observed that substantial enzymatic browning occurs if the surfaces of the potatoes are exposed to oxygen prior to cooking. Enzymatic breakdown also occurs in diseased or bruised potato tubers. In potatoes, it is believed that polyphenol oxidase, i.e. phenolase, enzymes catalyze the breakdown of the substrates chlorogenic acid and tyrosine, to quinones and other compounds which can react with amino acids in a similar manner as sugars to produce Maillard reaction products.

Over the years, various techniques have been used for preventing or inhibiting enzyme activity. For example, it is conventional in the food industry to subject raw fruit or vegetables to blanching with steam or hot water so as to inactivate the enzymes. Although this treatment is generally effective, blanching has the disadvantage that the produce is at least partially cooked so that it no longer tastes like fresh food. In addition, the blanching may also cause leaching of valuable nutrient materials from the produce.

The use of sulfiting agents, such as sulphur dioxide and sodium bisulfite, to inactivate enzymes is also well known in the industry. Indeed, sulfite is believed to be the most effective chemical additive used to prevent enzymatic discoloration in most produce, and particularly potatoes and some fruits. In addition to sulfiting agents, other chemical preservation agents have been used for this purpose. Representative examples of such chemical preservation agents include discoloration inhibitors such as ascorbic acid, citric acid, sorbic acid, and malic acid, in addition to other additives such as salt, EDTA, dextrose, calcium chloride, sodium acid pyrophosphate and sodium citrate. However, none of these discoloration inhibitors have been found to be as effective as sulfites.

Use of these reagents, however, has the disadvantage in that the flavor of the food is typically affected to some degree and at times in an adverse, objectionable manner.

Notwithstanding effective treatment to inhibit enzymatic browning in produce, many types of produce, such as potatoes, which contain sugars and amino compounds, still suffer from browning, particularly in the dehydrated state. This is a paramount concern for the produce dehydrator, and particularly the potato processor, because certain types of potatoes tend to brown more than others.

In this regard, one of the most studied chemical changes in food products is the reaction of amino acids and sugars, first observed and described by Louis Camille Maillard, for whom the Maillard reaction is named. The Maillard reaction begins with sugars and amino compounds forming a reactive intermediate, i.e. 1-amino-1-deoxy-2-ketose, which breaks down by several alternative reaction pathways to form brown polymers, i.e., melanoidins. This type of non-enzymatic browning is one of the major causes of off-flavor in produce, and particularly in dehydrated potatoes.

Prior attempts to combat the discoloration of potatoes, and other produce which tend to experience browning reactions, includes pre-treatments with a sulfiting agent, such as sulphur dioxide, sodium bisulfite and/or sodium sulfite. It has also been proposed to protect produce against such browning reactions by treatments with other chemical agents and preservatives including sodium dithionite, sulfur, bromine, potassium bromate, furfuryl mercaptan, 2-mercaptoacedic acid, 3-mercaptopropianic acid, 4-mercaptobuteric acid, 1-propamthiol, ethane thiol, 2-mercaptoethonol, and iso-amyl nitrite. It is believed that these compounds exhibit an effect in preventing the formation of 1-amino-1-dioxy-2-ketose in the Maillard reaction. Sulfur dioxide is believed to accomplish this by attacking the double bonds of fructosamino acid.

Related to this, the prior art is replete with numerous patents which have attempted to overcome the problems of browning of produce. For example, U.S. Pat. No. 2,890,120, MAKOWER, treats edible plant material with an aqueous solution containing alcohol, alkyl benzine sodium sulphinate, and sufficient hydrochloric acid to give the solution a pH of 1.5. U.S. Pat. No. 2,893,878, SIMON, is directed to a process for treating potatoes with calcium chloride and a water-soluble sulfiting agent dissolved in water in such concentration as to deposit certain effective amounts of calcium chloride and sulphite on the potato to protect the potato against non-enzymatic discoloration during storage. U.S. Pat. No. 2,475,838, JOHNSON, treats fruit with a sulfiting agent, ascorbic acid, and an inorganic chloride to prevent browning. U.S. Pat. No. 2,857,282, JANSEN, treats edible plant material with N-acyl derivatives of mercapto amines which exhibit the ability to inhibit enzyme activity and thus prevent deleterious changes, such as browning, normally caused by enzyme action. U.S. Pat. No. 2,860,055, JANSEN, treats edible plant material with an enzyme inhibiting agent containing aliphatic compounds containing 1-mercapto radicals in a particular spatial relation to another mercapto radicals. U.S. Pat. No. 2,874,059, POWERS, treats produce with an aqueous solution containing salt and citric acid in order to inhibit browning. U.S. Pat. No. 3,987,208, RAHMAN, treats lettuce for use in salads with an aqueous solution of sodium meta bisulfites, citric acid, ascorbic acid and potassium sorbate so as to extend the storage life of the cut lettuce. U.S. Pat. No. 2,620,277, SCALERA, is directed to the treatment of peeled white potatoes with a solution of sodium sulphite and citric acid to prevent discoloration. U.S. Pat. No. 3,049,427, FELLERS, contacts vegetables with a solution of a soluble compound of ethylene diamine tetraacetic acid during a blanching operation so as to minimize the discoloration of processed potatoes. U.S. Pat. No. 4,097,612, POWRIE et al., treats potatoes with an aqueous solution of citrate in combination with sulphur dioxide, followed by immersion in an aqueous solution of an alkali metal pyrophosphate, and optionally a reducing saccharide, followed by immersion in an aqueous solution of an alkaline earth metal salt, and optionally an alkali metal chloride, so as to enhance the retention of potato whiteness, in addition to improving other organoleptic characteristics of the tuber.

As previously mentioned, the dehydrated potato industry has a particularly acute concern for preventing browning of the potatoes, which would otherwise render commercial dehydrated potato products unsuitable for extended storage prior to consumption. In this regard, the assignee of the instant application has used sulfur dioxide as a preservative in potato granules to stop non-enzymatic browning since its entry into the potato processing industry. Representative samples of patents which disclose the use of sulfiting agents in dehydrated potato processes include U.S. Pat. No. 3,027,264, IRMITER et al.; U.S. Pat. No. 3,220,857, HOLLIS, Jr. et al.; U.S. Pat. No. 3,343,970, PADER; and U.S. Pat. No. 3,968,260, SHATILA et al., the latter embodying prior attempts of the assignee of this application to produce low-sulfite dehydrated potato granules.

Cysteine has also been used as a food additive in various processed food products. In most applications, cysteine and other amino acids are incorporated for their flavoring effect. In this regard, U.S. Pat. No. 4,218,487, JAEGGI, is directed to synthetic flavorants made by heating a mixture of an amino sugar, cysteine or cysteine hydrochloride, a polyalcohol and/or water. U.S. Pat. No. 3,681,088, KATZ et al., is directed to a flavoring composition containing thiazo-based flavoring agents in combination with cysteine hydrochloride. U.S. Pat. No. 3,214,276, SAKAKIBARA et al., disclose the use of sodium cysteine-S-sulfinate as a food seasoning composition.

In addition to the common usage of cysteine as a flavoring ingredient, cysteine is also recognized for its effect on the color and preservation of the various animal flesh food products. In this regard, U.S. Pat. No. 3,851,078, KHAYAT et al., disclose that cysteine may enhance the color of tuna-type fish. U.S. Pat. No. 3,552,978, INKLAAR, discloses that cysteine, among other monobasic amino acids, are effective in improving color retention in meat-containing food. U.S. Pat. No. 3,637,772, KLAUI et al., disclose that anti-oxidants are often employed in combination with synergists, including cysteine. The BRAVERMAN, Introduction to the Biochemistry of Foods (Elsevier Publishing Co., New York 1963 pp. 246–247) publication discloses that cysteine, as well as certain other amino acids, have been suggested as an alternative to sulphur dioxide and sulfites for preventing oxidation.

L-cysteine HCl has been used in food products over the last 25 years. For example, L-cysteine HCl is approved in bakery products in amounts up to 0.009% of the flour used as a dough conditioner and as a nutrient supplement. L-cysteine HCl has also been used to prevent discoloration in pears, onions, fruit concentrates, as well as other foods. Related to this, L-cysteine, L-cystine and their derrivatives have been used in bakery products to enhance dough softening and homogenization, and to accelerate dough development, in addition to being used as baking additives as functional ingredients for maintaining dough elasticity, as well as to adjust the gluten quality of flour. In addition, L-cysteine has been used as curing and tenderizing agents in meat products, as well as a stabilizer in milk and dietetic foods. L-cysteine also exhibits antioxidative stabilization in mayonnaise, in addition to antioxidative stabilization and activation in dry yeast. L-cysteine has also been used as a colorant for ham, sausage, bacon and similar meats. In addition, L-cysteine is known to function as an antibrowning agent, and a stabilizer for vitamin C in fruit juice concentrates. Related to this, U.S. Pat. No. 3,352,691, discloses the use of 0.05 to 0.3% cysteine to prevent pink discoloration of comminuted white onions.

Notwithstanding the various alternatives which have been suggested and tried by the prior art over the years to find effective anti-browning agents and preservatives, sulfite continues to be generally recognized as the most effective chemical agent useful for minimizing discoloration of fruits and vegetables, and notably potatoes, processed by commercial production methods.

Nevertheless, there has been a growing concern for and an aversion to the use of sulfites in food products. Recently, the use of sulfites has been banned by the Food and Drug Administration for treating fresh fruits and vegetables. In view of the related concerns expressed for the use of sulfites in processing produce, there is a real need for a preservative composition which minimizes or completely eliminates the need for sulfites in the preservation of produce without compromising the effects on inhibiting or preventing the occurrence of browning reactions.

The present invention, therefore, is directed to compositions and methods for treating produce, and particularly processed potatoes, such as dehydrated potatoes, i.e., potato granules, with a composition including cysteine so as to prevent the adverse effects of enzymatic and non-enzymatic browning. In accordance with the present invention, the processing of produce involves subjecting produce to a composition containing synergistically effective amounts of cysteine, in combination with calcium chloride and sodium acid pyrophosphates, and/or relatively minor amounts of a sulfiting agent, in a manner which results with a finished product containing less than about 50 ppm, and preferably less than 30 ppm sulfite, but most preferably wherein the finished product contains less than 10 ppm or essentially no sulfite.

SUMMARY OF THE INVENTION

An object of the present invention is to provide a method for treating produce to minimize enzymatic browning upon subsequent processing, handling and/or storage which involves treating produce with discoloration inhibitors selected from the group consisting of a source of available cysteine, and a mixture consisting of a source of available cysteine and a sulfiting agent. Preferably the cysteine is present in a solution on a total weight basis within the following ranges: up to about 0.5% cysteine; preferably about 0.1–0.5% cysteine and more preferably about 0.2–0.5% cysteine. In the former instance the produce should be pretreated with a source of sulfite prior to treating with cysteine. Where a mixture of a source of available cysteine and a sulfiting agent is used, the sulfiting agent may be present in amounts up to about 0.5% and preferably 0.05–0.5% sulfiting agent.

Another object of the present invention is to provide methods for treating produce to minimize non-enzymatic browning upon subsequent processing, handling and/or storage, which involves exposing produce to discoloration inhibitors including synergistically effective amounts of cysteine, calcium chloride, and sodium acid pyrophosphate (SAPP) wherein the discoloration inhibitors are present on a total weight basis in the finished product within the following ranges: 0.025–0.2% cysteine, 0.025–0.2% calcium chloride, and 0.025–0.2% SAPP. Other calcium salts and sequestrants and chelating agents, such as EDTA or citric acid may also be used in combination with cysteine sequestrants and chelating agents which may be used include polycarboxylic acids, such as oxalic and succinic acids, hydroxycarboxylic acids, such as malic and tartaric acids as well as citric acid, polyphosphoric acids, such as ATP, hexametaphosphate, and pyrophosphate, and amino acids, such as glycine and leucine. These discoloration inhibitors can be added dry or in aqueous solution during blanching, cooking and/or during preparation after cooking and prior to dehydration or other processing such as freezing or canning.

Another further object of the present invention is to provide methods for treating produce to minimize browning upon subsequent processing, handling and storage, which involves preparing the produce for processing, for example, by cleaning, trimming, and/or peeling the produce, followed by subdividing the produce into pieces such as slices, dices, strips or shreds, treating the produce with a discoloration inhibitor, preferably in an aqueous solution, comprising effective amounts of cysteine to prevent browning upon subsequent processing including a treatment at elevated temperatures. As used herein, the term "elevated temperatures" is meant to include temperatures substantially above ambient temperature under normal conditions, for example of about 70°–575° F. Thus, elevated temperatures include temperatures experienced during precooking and cooking operations, in addition to temperatures used during dehydration procedures, for example used in processing potato pieces into dehydrated mashed potatoes, such as granules and flakes, as well as temperatures to which produce are exposed during storage and handling, for example in a closed container or shipper. Therefore, elevated temperatures for purposes of the present invention are temperatures above about 70° F. and preferably above about 80° F. to about 550°–575° F., and preferably within the range of about 120° F. to about 550° F.

In accordance with the present invention, therefore, produce such as potatoes which may have been subjected to minor amounts of a sulfiting agent during a preliminary stage of preparation and handling, are treated with discoloration inhibitors selected from the group consisting of cysteine, a combination of cysteine and sulfite, a combination of cysteine and calcium chloride, a combination of cysteine, calcium chloride, and sodium acid pyrophosphate (SAPP), and a combination of cysteine, calcium chloride, SAPP and sodium sulfite, in amounts effective to minimize browning of the product during subsequent processing, handling and/or storage. Preferably, sulfite-treated potatoes are treated with discoloration inhibitors in accordance with the present invention to produce dry potato products that contain less than 30 ppm of a sulfiting agent and preferably less than 10 ppm or essentially no sulfiting agent, and contain 0.025–0.2% cysteine, 0.025–0.2% calcium chloride and 0.025–0.2% SAPP. The effectiveness of treating potato granules with discoloration inhibitors in accordance with the present invention is characterized by an Agtron reflectance meter reading of above 40 and preferably within the range of 40–50 which indicates the whiteness manifested by the final product. Therefore, produce treated with discoloration inhibitors in accordance with the present invention contains essentially no or only incidental amounts of sulfite and yet does not tend to experience browning which would normally occur unless greater amounts of sulfite were used during processing.

BRIEF DESCRIPTION OF PHOTOGRAPHS

FIGS. 1–4 are photographs illustrating the comparison of the test samples of Examples IV–VII, respectively.

DETAILED DESCRIPTION

Figure 1:
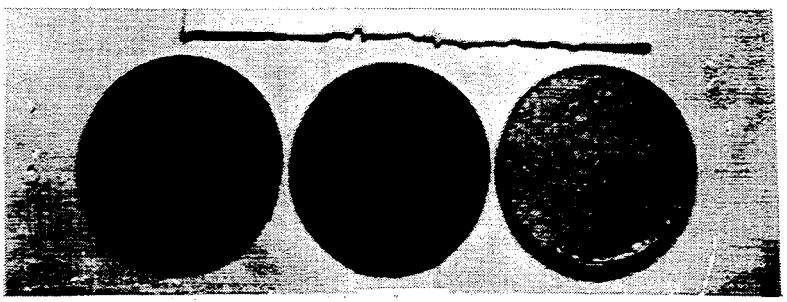

In general, the present invention is directed to methods for treating produce pieces to minimize browning upon subsequent processing, handling and storage, as described above, wherein the produce pieces are immersed in an aqueous solution containing a sulfiting agent followed by treatment with an aqueous solution containing cysteine, preferably prior to processing which involves dehydration. Alternatively, the produce pieces are treated with an aqueous solution containing discoloration inhibitors including synergistic amounts of cysteine and sulfite effective to prevent browning of the produce.

In accordance with the present invention, the method for treating produce to minimize browning upon subsequent processing, handling, and storage involves exposing produce to a discoloration inhibitor selected from the group consisting of a source of available cysteine, and a mixture consisting of a source of available cysteine and a sulfiting agent, preferably wherein the step of exposing the produce to the discoloration inhibitor is accomplished in a step selected from the group of steps consisting of immersing the produce in a solution containing the discoloration inhibitor and spraying the produce with the solution. For purposes of the present invention the solution includes discoloration inhibitors preferably selected from the group of consisting of an amount up to about 0.5% cysteine and more preferably 0.2–0.5% cysteine; and an amount up to about 0.5% cysteine and an amount up to about 0.1% sulfiting agent and more preferably 0.2–0.5% cysteine and 0.50–0.1% sulfiting agent although the solution may contain discoloration inhibitors in an amount up to about 0.1% sulfiting agent, and an amount up to about 0.5% sodium acid pyrophosphate. More preferred are solutions containing discoloration inhibitors selected from the group consisting of 0.2–0.5% cysteine; 0.2–0.5% cysteine and 0.05–0.1% sulfiting agent; 0.025–0.5% cysteine, 0.025–0.5% sodium acid pyrophosphate 0.05–0.1% sulfiting agent. Subsequently the produce treated with the previously mentioned discoloration inhibitors may be processed by a procedure selected from the group consisting of dehydrating, cooking, canning, aseptic, refrigerating and freezing.

In the embodiments where potatoes are sprayed aqueous solutions containing cysteine, and cysteine with sodium acid pyrophosphate, and cysteine with sodium acid pyrophosphate, and a sulfiting agent, the aqueous solution preferably include an amount of cysteine to result in a cysteine content of less than 0.1% in the dry product, contains cysteine and sodium acid pyrophosphate to result in a cysteine content of less than 0.1% and a sodium acid pyrophosphate content less than 0.2% in the dry product; or contains cysteine, sodium acid pyrophosphate, and a sulfiting agent to result in a cysteine content of less than 0.1%, a sodium acid pyrophosphate content of less than 0.2% and a sulfite content (as sulfur dioxide) of less than 0.003% in the dry product.

Preferred products produced in accordance with the present invention include potato products containing cysteine provided by extraneously added cysteine and less than about 30 ppm sulfur dioxide exhibiting a color measured by an Agtron reflectance meter rating of above 40, preferably wherein the Agtron reflectance rating rating is above 50, and the sulfur dioxide is present in amounts less than 10 ppm, and most preferably wherein the products contain essentially no sulfur dioxide. Preferred potato products are selected from the group consisting of dehydrated potato pieces and dehydrated mashed potato products wherein the dehydrated mashed potato products are selected from the group consisting of dehydrated potato granules, dehydrated potato flakes and agglomerates of dehydrated potato granules, and preferably dehydrated potato granules.

A suitable composition for treating produce in accordance with the present invention contains an amount up to about 0.5% cysteine and an amount up to about 0.1% sulfiting agent, and preferably 0.2–0.5% cysteine and 0.05–0.1% sulfiting agent.

Another suitable composition for treating produce in accordance with the present invention includes an amount that the dehydrated produce contains up to about 0.2% cysteine, and amount up to about 0.2% calcium chloride, and an amount up to about 0.2% sodium acid pyrophosphate, i.e., 0.025–0.2% cysteine, 0.025–0.2% calcium chloride, and 0.025–0.2% sodium acid pyrophosphate; and more preferably 0.1–0.15% cysteine, 0.1% calcium chloride, and 0.1% sodium acid pyrophosphate.

A yet another suitable composition for treating produce in accordance with the present invention includes an amount up to about 0.2% cysteine, an amount up to about 0.003% sulfiting agent, an amount up to about 0.2% calcium chloride, and an amount up to about 0.2% sodium acid pyrophosphate, and preferably 0.025%–0.2% cysteine, 0.001–0.003% sulfiting agent, 0.025–0.2% calcium chloride, and 0.025–0.2% sodium acid pyrophosphate, and most preferably 0.05–0.15% cysteine, less than 0.001% sulfiting agent, 0.1% calcium chloride, and 0.1% sodium acid pyrophosphate. The process of the present invention has been developed in an attempt to substantially reduce and essentially eliminate the use levels of sulfiting agents in the processing of produce, and particularly potatoes, which are subjected to elevated temperatures, and particularly temperatures to which the produce are exposed during dehydration.

In this regard, it has been discovered that exposing produce to discoloration inhibitors including cysteine preferably together with sulfite, and more preferably also calcium chloride and sodium acid pyrophosphate, in synergistically effective amounts, essentially eliminates the need for treating the produce with sulfiting agents at conventional levels and yet minimizes browning and discoloration of the produce upon subsequent processing, handling and storage. In accordance with the present invention, therefore, produce may be processed by a method which involves treating the produce in a manner so as to result with a finished product which contains less than about 50 ppm, and preferably less than about 30 ppm, and most preferably less than 10 ppm or essentially no sulfiting agent.

As used herein, "cysteine" is provided by any suitable source of cysteine. The common or usual name of cysteine used in accordance with the present invention is L-cysteine hydrochloride monohydrate, the chemical name for which is L-2-amino-3-mercaptropropanocic acid hydrochloride monohydrate having the following structural formula:

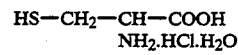

The L-cysteine hydrochloride monohydrate is manufactured by first extracting L-cysteine from keratine which is then dissolved in HCl, subjected to electrical reduction, concentrated, crystallized, and centrifuged to result in L-cysteine hydrochloride monohydrate.

Although the discovery of the present invention may be used in conjunction with processing various fruits, such as apples, apricots, avocados, bananas, peaches and pears; vegetables such as beans, bell peppers, carrots, celery, corn, garlic, horseradish, leek, lentils, lima beans, mushrooms, onions, parsnips, peas, pimientos, tomatoes and turnips; and tubers, such as Russet, Kennebec, Hilite, Norkota and Norgold varieties of solanum tuberosum, into dehydrated piece products, such as slices, dices, strips, shreds and the like, the present invention finds special utility in the processing of potatoes such as the previously mentioned varieties of solanum tuberosum into dehydrated mashed potato products, such as granules, flakes and agglomerates. Accordingly, the detailed description of the present invention will be given with respect to the processing of potatoes, and particularly with respect to the production of dehydrated potatoes, such as potato pieces, potato granules, and potato flakes.

As previously indicated, the present invention is based on the discovery that the need for sulfite can be substantially reduced or essentially eliminated in the processing of produce without sacrificing the organoleptic characteristics of the finished product by exposing the produce to an effective amount of cysteine to minimize browning upon subsequent processing, handling and storage, particularly as part of a process which involves subjecting the produce to elevated temperatures.

For purposes of the present invention, the elevated temperatures to which the produce are subsequently subjected fall within the range of about 70° F.–575° F. and typically within the range of 120° F.–550° F. for example as a result of subjecting the produce to a process step selected from the group of steps consisting of blanching, cooking, dehydrating, a sequence of blanching and dehydrating steps, and a sequence of cooking and dehydrating steps, preferably wherein the blanching step involves subjecting the produce to a medium selected from the group consisting of water, steam and a mixture of water and steam at temperatures within range of about 120° F.–212° F.

More specifically, one embodiment of the present invention is directed to the production of dehydrated potato pieces, such as dices, slices, shreds, strips and the like. The following description is a representative example of a process for producing such dehydrated potato piece products modified to provide for a treatment with the discoloration inhibitors in accordance with the present invention.

Potatoes are first cut, after having been washed, trimmed and optionally peeled, into large pieces which may have a size of about ½ inch×½ inch×½ inch. The potatoes may also be cut into pieces having other shapes and sizes, such as 1/16×⅜ inch slices and dices, in addition to strips, for example french-fry cuts, and shreds, suitable for hashbrowns. The potato pieces are then immersed in a holding tank of water which contains certain additives found to be effective in minimizing the discoloration of the potatoes in this stage of the process. Suitable additives include cysteine, and sulfiting agents, such as sodium sulfite and sodium bisulfite. Acids, such as citric and phosphoric acids, may also be included in the holding tank, preferably in lieu of sulfiting agents.

The potato pieces may then be subjected to treatments which include heating with steam or water having a temperature within the range of 120°–212° F., and preferably between about 165°–200° F., for between 2 to 75 minutes, optionally followed by cooling in tap water to a temperature below about 80° F. Most preferably, the pieces are blanched in steam or water at 200° F.–212° F. for between 2 to 12 minutes. After blanching, or blanching and cooking the potatoes under such conditions, the potatoes are treated with a discoloration inhibitor containing between 0.015% and 0.15% cysteine. Particularly preferred results are achieved, however, by using a solution containing synergistically effective amounts of cysteine and sodium acid pyrophosphate (SAPP) within the ranges of up to about 0.2% and preferably about 0.025%–0.2% cysteine and SAPP. The potatoes may be sprayed with or dipped in the solution. Alternatively, the discoloration inhibitors in accordance with the present invention may be included in the blanch water so as to eliminate a separate treatment for this purpose. The heat-treated potato pieces are then fed into a conventional dryer, such as cabinet, tunnel, and conveyor dryers, and most preferably continuous belt or conveyor dryers. Typically air temperatures within the range of about 130°–285° F. are used. Drying times and temperatures are normally controlled so as to avoid scorching the finish-dried product. Thus temperatures are generally within the range of 140° F.–225° F. so as not to raise the product temperature to an unacceptably high level. Also the temperatures and times may be varied in the various stages of drying as is conventional in the art. In any event, the potato pieces are permitted to remain in the dryer for a sufficient period of time to reduce their moisture content to a storage stable extent of less than about 10%, i.e. about 7%.

Upon extended storage, it is observed that the dehydrated potato pieces treated with discoloration inhibitors in accordance with the present invention do not discolor to an appreciable extent, but maintained a substantially light color despite containing essentially no sulfite, i.e., a sulfite content of less than 10 ppm. Thus, the present invention produces acceptable products wherein the solution in the holding tank contains essentially no sulfiting agent, i.e., an amount of sulfite in the holding tank which results in a finish dried product containing less than about 10 ppm sulfite.

The discovery of the present invention is particularly suitable in the production of dehydrated mashed potato products, such as potato granules. A typical process for the production of potato granules involves first preparing raw potatoes for cooking in a usual manner, for example by washing, trimming and cutting, and optionally peeling. The prepared pieces of potato are then transferred to a holding tank containing water and conventional additives, such as a sodium bisulfite solution, to prevent discoloration. As disclosed in U.S. Pat. No. 3,986,260, the holding tank normally contains an aqueous solution of sodium bisulfite present in an amount of at least 0.5% by weight of sulfite. In contrast to conventional potato granule production methods, including the process which is referred to as a low-additive process by U.S. Pat. No. 3,986,260, the present invention uses less than about 0.5%, and preferably on the order of 0.1%, sulfiting agent in the solution of the holding tank. In accordance with the present invention, a source of cysteine may be substituted for all or part of the sulfiting agent in the holding tank. This results in a $SO_2$ content in the finished product which is less than about 30 ppm sulfite, and preferably less than 10 ppm sulfite, i.e., essentially no sulfite, in contrast to the sulfite content of conventional mashed potato products which typically contain at least 200–500 ppm $SO_2$. Thus, processing potatoes in a manner in accordance with the present invention results in a finished product containing sulfites at levels far below the amount normally found in dehydrated instant mashed potato products.

The next stage of processing involves cooking the prepared potatoes. As will be appreciated by one skilled in the art, any conventional method of cooking potatoes to completion can be employed at this stage of the process. Although it is preferred to cook with atmospheric steam, hot water, and in certain instances even hot oil, may be used with satisfactory results.

Prior to subjecting the potatoes to cooking, however, it is preferred to subject the prepared potatoes to pre-cooking and cooling steps. It is generally recognized in the art that this particular sequence of steps results in a tougher cell structure that resists rupture during processing and results with a more mealy finished mash. Notwithstanding the preference of this sequence of steps, the process of the present invention can be carried out by eliminating the pre-cook and cool steps prior to cooking if this is so desired.

The next stage of processing involves separating the cooked potato cells by partially mashing the cooked potatoes, as by ricing. This is the step wherein additives, such as starch complexing emulsifiers, e.g., glycerol monostearate, are incorporated into the mash. It is this stage of processing wherein it is preferred to expose the potatoes to discoloration inhibitors including a source of available cysteine in accordance with the present invention. Accordingly, the potatoes at this stage of processing are exposed to discoloration inhibitors in accordance with the present invention, including a source of available cysteine, in addition to other additives such as calcium chloride, other calcium salts, EDTA, sodium acid pyrophosphate, and/or optionally a sulfiting agent. The discoloration inhibitors in accordance with the present invention are preferably incorporated into the potatoes at this stage of processing in amounts which result in the following synergistic amounts by total weight of the potato product: an amount up to about 0.2% and preferably in the range of about 0.025–0.2% cysteine, an amount up to about 0.2% and preferably in the range of about 0.025–0.2% calcium chloride, and an amount up to about 0.2% and preferably in the range of about 0.025–0.2% sodium acid pyrophosphate. If a sulfiting agent is introduced to the potatoes at this stage of processing, it is added in an amount to result in preferably less than 100 ppm sulfite, and more preferably less than 30 ppm sulfite, and most preferably less than about 10 ppm or essentially no sulfite in the finish-dried product. In those instances where sulfite has been included in the holding tank, as previously described, the discoloration inhibitors used at this stage of processing preferably result with about 0.05–0.15% cysteine, about 0.1% calcium chloride and about 0.1% sodium acid pyrophosphate in the finish-dried product. More preferably, the discoloration inhibitors used at this stage of processing result with about 0.1% cysteine, about 0.1% calcium chloride, and about 0.1% sodium acid pyrophosphate in the finish-dried product.

As the discoloration inhibitors, as well the starch complexing emulsifiers and other additives, are introduced during this stage of processing, the potatoes are continuously mixed to accomplish complete cell separation. In so doing, the emulsifier, as well the discoloration inhibitors in accordance with the present invention, are uniformly distributed throughout the mash, and the separated cells are uniformly exposed to and coated with the additives.

The next stages of processing follow conventional add-back dehydrated potato granule processing which is well known to those skilled in the art of potato dehydration.

For example, the process of the present invention may be applied to any potato dehydration process, such as processes for producing dehydrated granules disclosed by TALBURT & SMITH, Potato Processing, Chapter 12 entitled "Dehydrated Mashed Potato Granules", AVI Publishing Co., Westport, Conn., Third Edition, 1975, pp. 443–459.

Granules made in accordance with the present invention may then be used to form a variety of granular-based dehydrated potato products suitable for forming mashed potatoes or reconstituted into a formed potato product.

The present invention is also useful in minimizing browning of potatoes processed into dehydrated mashed potato flakes. In this regard, the discoloration inhibitors in accordance with the present invention are added to the potatoes at the stage in an otherwise conventional flake production process wherein additives, such as sulfites, antioxidants and the like, are normally introduced.

Suitable processes for purposes of the present invention are disclosed by TALBURT & SMITH, Potato Processing, Chapter 13 entitled "Potato Flakes", AVI Publishing Co., Westport, Conn., Third Edition, 1975, pp. 463–512.

In such a conventional flake production process, potatoes are first peeled and trimmed in a conventional manner prior to being sliced, for example, into one-half inch slabs. The potato pieces are then preferably pre-cooked in water followed by first cooling prior to cooking and then mashing, ricing for example by using conventional equipment for this purpose.

Additives, such as agents to improve the flavor, stability and texture of the product, are normally incorporated into the riced material before drying. In conventional potato flake processes, a source of sulfite, such as sodium sulfite or sodium bisulfite, is normally used to prevent oxidative changes during processing and to improve shelf life. Typically, sulfite is used in amounts so as to result in 400–500 ppm $SO_2$ in the riced potatoes. Inasmuch as subsequent processing by dehydration removes some of the previously added $SO_2$, conventional dehydrated potato flakes normally contain about 150–200 ppm $SO_2$. Other additives which are normally included into the riced potatoes at this stage of processing include antioxidants and monoglycerides. In accordance with the present invention, therefore, cysteine, preferably in combination with SAPP in synergistically effective amounts within the ranges of up to about 0.2% and preferably 0.025%–0.2% cysteine and SAPP are mixed with the riced potatoes at this stage of processing in lieu of a source of sulfite. The resultant dehydrated potato product, therefore, is essentially sulfite-free.

Following addition and mixing of the potatoes with the discoloration inhibitors in accordance with the present invention, the potato mash is then fed to a conventional drum dryer on which the mash is spread into a thin film and dehydrated to a storage stable moisture content. The dried sheet of mashed potato is then peeled away from the drum and subdivided into pieces which are further broken into random-sized flakes which are then packaged for subsequent storage, handling and shipping.

The following examples are intended to be representative of the processes and products of this invention. It will be apparent, however, that the details of the examples are not to be regarded as limitations, as they may be varied to a certain extent, as will be understood by one skilled in the art.

For purposes of the present invention, the sulfite content of the products has been analyzed using a procedure known as the "Monier-Williams Procedure" mentioned in 21 C.F.R. 101 (Appendix A—Monier-Williams Procedure for Sulfites in Food). In brief, the AOAC official method for sulfites has been modified by the Monier-Williams Procedure to facilitate the determination of sulfites at or near 10 ppm in food. Thus, the methodology used in analyzing the sulfite content of products produced in accordance with the present invention is the technique which has been approved by the FDA as being effective in detecting as little as 10 ppm of sulfite in a finished food product.

EXAMPLE I

Potatoes prepared for processing in a conventional manner by washing, peeling and trimming were immersed in a holding tank. For the control run, no sulfite or other discoloration inhibitor was included in the holding tank water, and no cysteine was used in the process. In the other runs conducted for purposes of comparison, the amount of sulfite in the holding tank is indicated in the table below. The potatoes were then subjected to a cooking procedure which involved pre-cooking the potatoes to an internal piece temperature within the range of 150° F.-180° F., followed by cooling to a piece temperature within the range of 60° F.-70° F. Subsequently, the potatoes were cooked after which discoloration inhibitors in accordance with the present invention in the amounts listed in the table below were introduced. The cooked potatoes are mashed, mixed and conditioned prior to being introduced to an air-lift dryer, the air temperature in which is controlled such that hot air having a temperature within the range of 525° F.-560° F., when introduced into the air-lift dryer, exits at a temperature within the range of 150° F.-220° F., so as to effect a product temperature on the order of about 130° F. The granular potatoes collected from the air-lift dryer are then finish-dried in a conventional fluid bed dryer using hot air at a temperature within the range of about 150° F.-120° F. which effects a product temperature of about 108° F.-110° F. until the moisture content is reduced to about 7-8%. Granular products in accordance with the previously described procedure were then measured for color using an Agtron reflectance meter, and judged by a taste panel for flavor. In this regard, Agtron reflectance meter readings above 40 are considered acceptable, and above 50 good to excellent. Flavor ratings of 3.0 are acceptable, and 4.0 are considered excellent. The results of these tests are tabulated below:

TABLE

| Run | Sulfite in Holding Tank | Processing Discoloration Inhibitor | | | | |
|---|---|---|---|---|---|---|
| | | Cysteine | CaCl2 | SAPP | Color | Flavor |
| Control | 0 | 0 | 0.1 | 0.1 | 20 | 2.5 |
| #1 | .1% | 0 | 0.1 | 0.1 | 35 | 3.0 |
| #2 | 0 | 0.14 | 0.14 | 0.14 | 52 | 4.0 |
| #3 | .1% | 0.14 | 0.14 | 0.14 | 62 | 4.0 |

(1) Percentage - Dry Wt Basis

| Run | Results $SO_2$ (ppm) Content | Color | Flavor |
|---|---|---|---|
| Control | 0 | 20 | 3.0 |
| #1 | <3 | 35 | 3.0 |
| #2 | 0 | 52 | 4.0 |
| #3 | <3 | 62 | 4.0 |

As can be seen, the control sample was unacceptable in color and marginal in flavor. The color and flavor of the dehydrated potato granules were improved somewhat when 0.1% sulfite was included in the holding tank. Treating the potatoes with a discoloration inhibitor solution containing cysteine showed markedly superior results, with the best results achieved when the potatoes are first exposed to a sulfiting agent in the holding tank, followed by treatment with a discoloration inhibitor solution containing cysteine, calcium chloride, and SAPP.

EXAMPLE II

The following test was conducted to visually compare the effect of discoloration inhibitor solutions containing a combination of a minor amount of sulfite and L-cysteine in minimizing the discoloration of raw produce versus the use of a solution containing only sulfite and a solution containing only L-cysteine.

Russet Burbank potatoes were washed, trimmed, and peeled before being cut into French-Fry strips, and divided into even batches which were treated with aqueous solutions having the following compositions:

| Batch A | 0.5% NaHSO2 |
|---|---|
| Batch B | 0.5% L-Cysteine |
| Batch C | 0.45% L-Cysteine |
| | 0.05% NaHSO2 |

Each batch was immersed in a respective discoloration inhibitor solution for ten (10) minutes prior to draining to remove excess solution followed by storage for seven (7) days at 40° F.

Following storage, each batch was evaluated by visual color change. Each of the strips treated with the 0.5% NaHSO2 solution had developed a moderately brown color over their entire surface. The strips treated with the 0.5% L-cysteine solution were even darker in color. In contrast, the strips of potatoes treated with the aqueous solution containing 0.45% L-cysteine and 0.05% NaHSO2, exhibited a uniformly light color which was not noticeably darker than the color of the fresh-cut slice.

The results of this test indicate that a discoloration inhibitor solution containing minor amounts of sulfiting agent together with a source of cysteine are synergistically effective in a manner superior to either sulfite or cysteine used alone in minimizing the discoloration of cut surfaces of raw potatoes upon storage.

EXAMPLE III

The following tests were conducted to show the effectiveness of a solution containing a combination of relatively minor amounts of sulfite and cysteine in reducing enzyme activity responsible for browning of produce compared to solutions containing significantly greater amounts of only a sulfiting agent or cysteine.

Russet Burbank potatoes were left unpeeled and sliced raw prior to dividing into batches for treatment in the following solutions:

| Solution | Enzyme Activity |
|---|---|
| Control (no discoloration inhibitor) | No inactivation of enzyme activity |
| NaHSO3 alone | |
| a) 0.1% | slight but uniform |
| b) 0.3% | substantially none except in area adjacent the peel |
| C) 0.5% | essentially none |
| L-cysteine alone | |
| a) 0.1% | about half the activity manifested in the control |
| b) 0.3% | slight but uniform |
| C) 0.5% | substantially none except in area |

| -continued | |
|---|---|
| NaHSO₃ + L-cysteine | adjacent the peel |
| a) 0.1% + 0.1% | substantially none except in the area adjacent the peel |
| b) 0.1% + 0.3% | essentially none |
| C) 0.1% + 0.5% | essentially none |

The slices of each batch were dipped in their respective discoloration inhibitor solutions and held for five (5) minutes. After draining to remove excess solution the slices were dipped in catechol for the purpose of assessing the enzymatic activity of the treated slices versus the control after 1 hour by visual color change.

The foregoing tests showed the slices treated with the discoloration inhibitor solution containing a combination of 0.1% NaHSO₃ and 0.1% L-cysteine experienced only slight discoloration near the peel to an extent similar to slices treated with solutions containing 0.3% NaHSO₃ and 0.5% L-cysteine alone. Thus, the combination of a sulfiting agent and a source of cysteine is synergistically effective in retarding enzyme activity and consequently enzymatic browning of raw produce.

The following examples are presented as an indication of the effectiveness of the L-cysteine compositions of the present invention for other fruits and vegetables by way of comparison with potatoes. In each of the following examples, a puree of the fruit, vegetable and potato was treated with amounts of L-cysteine HCl and compared to show the effectiveness of L-cysteine in minimizing discoloration.

EXAMPLE IV

Idaho Russet potatoes were peeled and ground into a puree in a Waring blender. Three samples were prepared. Sample 1 was the control which was not exposed to a discoloration inhibitor; 0.02% L-cysteine HCl was added to Sample 2; and 0.04% L-cysteine HCl was added to Sample 3. FIG. 1 is a photograph of the sample after exposure to air for two hours. As can clearly be seen, only Sample 3, with 0.04% L-cysteine added, remained substantially white.

EXAMPLE V

Figure 2:
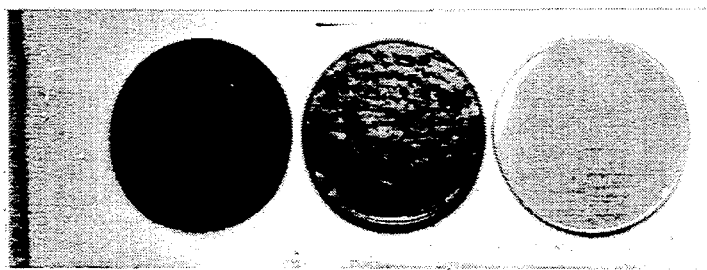

Red delicious apples were peeled, cored and pureed in a Waring blender. Three samples were prepared. No additive was added to Sample 1; 0.015% L-cysteine HCl was added to Sample 2; and 0.03% L-cysteine HCl was added to Sample 3. FIG. 2 is a photograph showing the difference in color developed immediately after the puree was made. As clearly indicated in the photograph, Sample 3 has the most desireable color with enzymatic darkening substantially completely inhibited.

EXAMPLE VI

Figure 3:

Apples were sliced about ⅛ inch thick and dried using 120° F. air for 3 hours. Sample 1 was untreated. Prior to drying, Sample 2 was dipped in a 0.5% solution of L-cysteine for 15 minutes. The photograph of FIG. 3 clearly shows that the treated Sample 2 is much whiter than the untreated sample.

EXAMPLE VII

Figure 4:
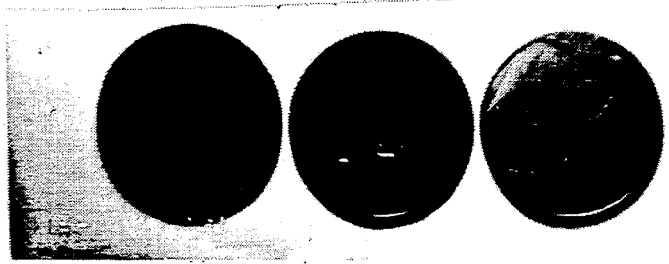

Avocados were peeled and the pits removed. The remaining pulp was ground to a puree in a Waring blender. Three samples were prepared. Sample 1 was treated with no additive, 0.035% L-cysteine HCl was added to Sample 2, and 0.07% L-cysteine HCl was added to Sample 3. FIG. 4 is a photograph of the three samples after exposure to air for 3 hours. As can be seen, only Sample 3, with 0.07% L-cysteine HCl added was satisfactory in color and flavor.

The previous examples show that L-cysteine HCl is effective in preventing color changes in purees and dried products made from fruits and vegetables, in addition to potatoes.

Table 1, appearing below, shows the level of L-cysteine most effective in apples, avocados and potatoes as tested. The level of addition that was effective in all three products was calculated to be 0.2% on a dry weight basis.

TABLE 1

LEVELS OF L-CYSTEINE HCl REQUIRED TO STOP DISCOLORATION OF PRODUCTS SHOWN IN EXAMPLES IV-VII

| Product | Solids | L-cysteine HCl | L-cysterine HCl Dry Basis |
|---|---|---|---|
| Apples | 15% | .03% | 0.2% |
| Dry Apple Slices | | Slices held 15 minutes in 0.5% solution | — |
| Avocado | 35% | .07% | 0.2% |
| Raw Potato | 20% | .04% | 0.2% |

EXAMPLE VIII

The following comparison is given to show that added cysteine is readily oxidized to its dimer form, i.e. cystine, is evidenced by the comparison of the relative cystine content of fresh potatoes (Table A), conventional dehydrated potato granules processed without extraneously added cysteine otherwise produced in accordance with the previously described process (Table B), and dehydrated potato granules processed with added cysteine in accordance with the present invention as disclosed herein (Table C):

Summary of Results

TABLE A

| Cystine in Raw Potatoes | | |
|---|---|---|
| Raw Potatoes Source | | Cystine mg/100 g As Is |
| Clements | A | 2.40 |
| | B | 2.49 |
| | C | 2.71 |
| | D | 2.76 |
| | | Avg. 2.59 |
| Boondox | A | 2.92 |
| | B | 2.31 |
| | C | 4.30 |
| | D | 4.00 |
| | | Avg. 3.38 |
| Holmes | A | 3.71 |
| | B | 4.97 |
| | C | 3.56 |
| | D | 2.54 |
| | | Avg. 3.69 |

Avg 12 Samples - 3.22

TABLE B

| Cystine in Processed Potato Granules | | |
|---|---|---|
| Run | | Cystine mg/100 g As Is |
| RP 012487 | A | 13.80 |
| (no added cysteine) | B | 10.83 |
| | C | 18.82 |
| | D | — |
| | | Avg. 14.48 |
| RP 092686 | A | 12.79 |
| (no added cysteine) | B | 11.13 |

TABLE B-continued

| Cystine in Processed Potato Granules | | |
|---|---|---|
| Run | | Cystine mg/100 g As Is |
| | C | 9.66 |
| | D | 26.73 |
| | | Avg. 14.97 |
| BP 062287 | A | 20.03 |
| (no added cysteine) | B | 13.06 |
| | C | 12.61 |
| | D | 17.96 |
| | | Avg. 15.92 |

Avg 12 Samples - 15 mg

TABLE C

| Cystine in Processed Potato Granules | | |
|---|---|---|
| Run | | Cystine mg/100 g As Is |
| ML 051487 | A | 21.64 |
| (.10% cysteine added) | B | 19.70 |
| | C | 28.67 |
| | D | 24.67 |
| | | Avg. 23.67 |
| ML 3110586 | A | 42.44 |
| (.14% cysteine added) | B | 18.57 |
| 988-1 | C | 14.14 |
| | D | 20.73 |
| | | Avg. 23.97 |
| ML 3110686 | A | 24.87 |
| (.10% cysteine added) | B | 17.85 |
| 988-1 | C | 22.61 |
| | D | 6.01 |
| | | Avg. 25.34 |

Avg 12 Samples - 24 mg

As shown above in Table A, fresh potatoes average 3.22 mg cystine/100 g raw or about 16 mg cystine/100 g on a dry solids basis. Dehydrated potato granules average about 15 mg cystine/100 g (Table B); and dehydrated potato granules with 100 to 140 mg cysteine added/100 g dry average about 24 mg cystine/100 g (Table C).

In accordance with the present invention, the total cystine content of dehydrated potato granules is increased only 9 mg/100 g when 100 to 140 mg cysteine is added in process over what would otherwise be present in the potato granules. Nevertheless, despite such a small increase in the cystine content as a result of processing in accordance with the present invention, the use of cysteine in processing potatoes has been discovered to be effective in minimizing browning of potatoes which could otherwise occur, and has been found to be an effective substitute for sulfites in the prevention of browning.

From the foregoing description, one skilled in the art can easily ascertain the essential characteristics of this invention and, without departing from the spirit and scope thereof, make various changes and modifications of the invention to adapt it to various usages and conditions.

What is claimed is:

1. A method for treating produce to minimize browning of said produce, said process comprising:
exposing produce to a discoloration inhibiting agent comprising a mixture of a source of available cysteine and a sulfiting agent in amounts effective to minimize browning of said produce upon subsequent processing, handling and storage, and subjecting said produce to a procedure selected from the group consisting of processing, handling, and storage.

2. The method for treating produce to minimize browning in accordance with claim 1, wherein said produce is a member selected from the group consisting of fruits, vegetables, and tubers.

3. The method for treating produce to minimize browning in accordance with claim 2, wherein said fruits are members selected from the group consisting of apples, apricots, avocados, bananas, peaches, and pears.

4. The method for treating produce to minimize browning in accordance with claim 2, wherein said vegetables are members selected from the group consisting of beans, bell peppers, carrots, celery, corn, garlic, horseradish, leeks, lima beans, mushrooms, onions, parsnips, peas, pimiento, tomato, and turnips.

5. The method for treating produce to minimize browning in accordance with claim 2, wherein said tubers are varieties of solanum tuberosum.

6. The method for treating produce to minimize browning in accordance with claim 5, wherein said varieties of solanum tuberosum are selected from the group consisting of Russet potatoes, Kennebec potatoes, Hilite potatoes, Norkata potatoes, and Norgold potatoes.

7. The method for treating produce to minimize browning in accordance with claim 6, wherein said Russet potatoes are Russet Burbank potatoes.

8. The method for treating produce to minimize browning in accordance with claim 1, wherein said exposing is accomplished in a step selected from the group of steps consisting of immersing said produce in a solution containing said discoloration inhibitor and spraying said produce with a solution containing said discoloration inhibitor.

9. The method for treating produce to minimize browning in accordance with claim 8, wherein said mixture comprises an amount up to about 0.5% cysteine, and an amount up to about 0.1% sulfiting agent.

10. The method for treating produce to minimize browning in accordance with claim 9, wherein said mixture comprises 0.2–0.5% cysteine, and 0.5–0.1% sulfiting agent.

11. The method of treating produce to minimize browning in accordance with claim 1, wherein said processing comprises a technique selected from the group consisting of dehydrating, cooking, canning, aseptic treating, refrigerating and freezing.

12. The method of treating produce to minimize browning in accordance with claim 1, wherein said storage is under refrigerated conditions.

13. The method of treating produce to minimize browning in accordance with claim 12, wherein said refrigerated conditions comprise freezing temperatures.

14. A method for treating potatoes to minimize browning upon subsequent handling, processing, and storage comprising:
a) preparing potatoes for processing;
b) exposing said potatoes to a discoloration inhibitor comprising an effective amount of cysteine and a member selected from the group consisting a sulfiting agent, sodium acid pyrophosphate, calcium chloride, and mixtures of a sulfiting agent, sodium acid pyrophosphate, and calcium chloride, for preventing browning upon subsequent processing involving subjecting said potatoes to elevated temperatures; and
c) dehydrating said potatoes to produce a dry product having a storage-stable moisture content.

15. The method for treating potatoes in accordance with claim 14, where the potatoes are pieces selected from the group consisting of slices, shreds, and dice.

16. The method for treating potatoes in accordance with claim 15, wherein said pieces have a dimension in the range of 1/16 to 3/16" inch.

17. The method for treating produce to minimize browning in accordance with claim 14, wherein said processing involves blanching said potatoes in an aqueous medium having a temperature within the range of about 120° F.–212° F.

18. The method for treating produce to minimize browning in accordance with claim 17, wherein said aqueous medium is selected from the group consisting of water, steam, and a mixture of water and steam.

19. The method for treating potatoes to minimize browning in accordance with claim 14, wherein said dehydrating is performed in a conveyor type dryer.

20. The method for treating potatoes to minimize browning in accordance with claim 14, wherein said discoloration inhibitor is in an aqueous solution.

21. The method for treating potatoes to minimize browning in accordance with claim 20, wherein said aqueous solution comprises discoloration inhibitors selected from the group consisting of a mixture consisting of a source of available cysteine and a sulfiting agent; a mixture consisting of a source of available cysteine, and sodium acid pyrophosphate; and a mixture consisting of a source of available cysteine, a sulfiting agent, and sodium acid pyrophosphate.

22. The method for treating potatoes to minimize browning in accordance with claim 21, wherein said aqueous solution comprised synergistic amounts of a mixture consisting of cysteine and a sulfiting agent effective to prevent browning of said potatoes.

23. The method for treating potatoes to minimize browning in accordance with claim 21, wherein said aqueous solution comprises discoloration inhibitors selected from the group consisting of:
  a) an amount up to about 0.5% cysteine, and an amount up to about 0.1% sulfiting agent; and
  b) an amount up to about 0.5% cysteine, and an amount up to about 0.1% sulfiting agent, and an amount up to about 0.5% sodium acid pyrophosphate.

24. The method for treating potatoes to minimize browning in accordance with claim 23, wherein said solution comprises discoloration inhibitors selected from the group consisting of:
  a) 0.2–0.5% cysteine, and 0.05–0.1% sulfiting agent; and
  b) 0.025–0.5% cysteine, 0.025–0.5% sodium acid pyrophosphate, and 0.05–0.1% sulfiting agent.

25. The method for treating potatoes to minimize browning in accordance with claim 14, wherein said exposing said potatoes to a discoloration inhibitor comprises a step selected from the group consisting of immersing said potatoes in a solution comprising said discoloration inhibitor and spraying said potatoes with a solution comprising said discoloration inhibitor.

26. The method for treating potatoes to minimize browning in accordance with claim 25, wherein said step comprising spraying said potatoes with an aqueous solution comprising a member selected from the group consisting of cysteine, a mixture of cysteine and sodium acid pyrophosphate, and a mixture of cysteine, sodium acid pyrophosphate, and a sulfiting agent.

27. The method for treating potatoes to minimize browning in accordance with claim 26, wherein said cysteine is present in said aqueous solution in an amount to result in a cysteine content of less than 0.1% in said dry product.

28. The method for treating potatoes to minimize browning in accordance with claim 27, wherein said sodium acid pyrophosphate is present in said aqueous solution in an amount of said sodium acid pyrophosphate to result in a sodium acid pyrophosphate content less than 0.2% in the dry product.

29. The method of treating potatoes to minimum browning in accordance with claim 28, wherein said sulfiting agent is present in said aqueous solution in an amount to result in a sulfite content as sulfur dioxide of less than 0.003%.

30. A composition for treating produce comprising an amount up to about 0.5% cysteine and an amount up to about 0.1% sulfiting agent.

31. The composition for treating produce in accordance with claim 30, comprising 0.2–0.5% cysteine and 0.05–0.1% sulfiting agent.

32. A composition for treating produce comprising an amount up to about 0.2% cysteine, an amount up to about 0.2% calcium chloride, and an amount up to about 0.2% sodium acid pyrophosphate.

33. The composition for treating produce in accordance with claim 32, comprising 0.025–0.2% cysteine, 0.025–2% calcium chloride, and 0.025–0.2% sodium acid pyrophosphate.

34. The composition for treating produce in accordance with claim 33, comprising 0.1–0.15% cysteine, 0.1% calcium chloride, and 0.1% sodium acid pyrophosphate.

35. A composition for treating produce comprising an amount up to about 0.2% cysteine, an amount up to about 0.003% sulfiting agent, an amount up to about 0.2% calcium chloride, and an amount up to about 0.2% sodium acid pyrophosphate.

36. The composition for treating produce in accordance with claim 35, comprising 0.025%–0.2% cysteine, 0.0001–0.003% sulfiting agent, 0.025–0.2% calcium chloride, and 0.025–0.2% sodium acid pyrophosphate.

37. The composition for treating produce in accordance with claim 36, comprising 0.05–0.15% cysteine, 0.0002–0.0003% sulfiting agent, 0.1% calcium chloride, and 0.1% sodium acid pyrophosphate.

38. A method for treating produce to minimize non-enzymatic browning upon subsequent processing, handling and storage comprising:
  exposing produce to a discoloration inhibitor selected from the group consisting of a mixture consisting of a source of available cysteine and a sulfiting agent, a mixture consisting of a source of available cysteine, calcium chloride and sodium acid pyrophosphate, and a mixture consisting of a source of available cysteine, a sulfiting agent, calcium chloride, and sodium acid pyrophosphate in amounts effective to minimize non-enzymatic browning, and subjecting said produce to elevated temperatures.

39. The method for treating produce to minimize browning in accordance with claim 38, wherein said elevated temperatures fall within the range of about 120° F.–550° F.

40. The method for treating produce to minimize browning in accordance with claim 39, wherein said exposing is accomplished in a step selected from the group of steps consisting of immersing said produce in a solution containing said discoloration inhibitor and spraying said produce with said solution.

41. The method for treating produce to minimize browning in accordance with claim 39, wherein said subjecting said produce to elevated temperatures comprises a process step selected from the group of steps consisting of blanching, cooking, dehydrating, a sequence of blanching and dehydrating steps, and a sequence of cooking and dehydrating steps.

42. The method for treating produce to minimize browning in accordance with claim 41, wherein said process step involves blanching said produce using a medium selected from the group consisting of water, steam, and a mixture of water and steam at temperatures within the range of 120° F.–212° F.

43. The method for treating produce to minimize browning in accordance with claim 42, wherein said produce is a member selected from the group consisting of fruits, vegetables and tubers.

44. The method for treating produce to minimize browning in accordance with claim 43, wherein said fruits are members selected from the group consisting of apples, apricots, avocados, bananas, peaches and pears.

45. The method for treating produce to minimize browning in accordance with claim 43, wherein said vegetables are members selected from the group consisting of beans, bell peppers, carrots, celery, corn, garlic, horseradish, leeks, lima beans, mushrooms, onions, parsnips, peas, pimiento, tomato and turnips.

46. The method for treating produce to minimize browning in accordance with claim 43, wherein said tubers are varieties of solanum tuberosum.

47. The method for treating produce to minimize browning in accordance with claim 46, wherein said varieties of solanum tuberosum are selected from the group consisting of Russet potatoes, Kennebec potatoes, Hilite potatoes, Norkota potatoes, and Norgold potatoes.

48. The method for treating produce to minimize browning in accordance with claim 47, wherein said Russet potatoes are Russet Burbank potatoes.

49. The method for treating produce to minimize browning in accordance with claim 41, wherein said process step comprises dehydrating said produce in hot air to remove at least a portion of natural moisture from said produce.

50. The method for treating produce to minimize browning in accordance with claim 49, wherein said produce are tubers selected from varieties of solanum tuberosum.

51. The method for treating produce to minimize browning in accordance with claim 50, wherein said solution comprises discoloration inhibitors selected from the group consisting of:
 a) an amount up to about 0.5% cysteine and an amount up to about 0.1% sulfiting agent;
 b) an amount up to about 0.2% cysteine, an amount up to about 0.2% calcium chloride, and an amount up to about 0.2% sodium acid pyrophosphate; and
 c) an amount up to about 0.2% cysteine, an amount up to about 0.0003% sulfiting agent, an amount up to about 0.2% calcium chloride, and an amount up to about 0.2% sodium acid pyrophosphate.

52. The method for treating produce to minimize browning in accordance with claim 51, wherein said solution comprises discoloration inhibitors selected from the group consisting of:
 a) 0.2–0.5% cysteine and 0.05–0.1% sulfiting agent;
 b) 0.025–0.2% cysteine, 0.025–0.2% calcium chloride, and 0.025–0.2% sodium acid pyrophosphate; and
 c) 0.025–0.2% cysteine, 0.0001–0.0003% sulfiting agent, 0.025–0.2% calcium chloride, and 0.025–0.2% sodium acid pyrophosphate.

53. A method for treating potatoes to minimize browning upon subsequent handling, processing, and storage comprising:
 a) preparing potatoes for processing;
 b) exposing said potatoes to a discoloration inhibitor selected from the group consisting of:
  1) an amount up to about 0.5% cysteine, and an amount up to about 0.1% sulfiting agent; and
  2) an amount up to about 0.5% cysteine, an amount up to about 0.1% sulfiting agent and an amount up to about 0.5% sodium acid pyrophosphate for preventing browning upon subsequent processing involving subjecting said potatoes to elevated temperatures; and
 c) dehydrating said potatoes to produce a dry product having a storage-stable moisture content.

54. A method for treating potatoes to minimize browning upon subsequent handling, processing, and storage comprising:
 a) preparing potatoes for processing;
 b) exposing said potatoes to a discoloration inhibitor selected from the group consisting of:
  1) 0.2–0.5% cysteine, and 0.05–0.1% sulfiting agent; and
  2) 0.025–0.5% cysteine, 0.025–0.5% sodium acid pyrophosphate, and 0.05–0.1% sulfiting agent for preventing browning upon subsequent processing involving subjecting said potatoes to elevated temperature; and
 c) dehydrating said potatoes to produce a dry product having a storage-stable moisture content.

55. A method for treating produce to minimize browning upon subsequent processing, handling and storage comprising:
 exposing produce to a discoloration inhibitor selected from the group consisting of
 a) an amount up to about 0.5% cysteine and an amount up to about 0.1% sulfiting agent;
 b) an amount up to about 0.2% cysteine, an amount up to about 0.2% calcium chloride, and an amount up to about 0.2% sodium acid pyrophosphate; and
 c) an amount up to about 0.2% cysteine, an amount up to about 0.0003% sulfiting agent, an amount up to about 0.2% calcium chloride, and an amount up to about 0.2% sodium acid pyrophosphate and subjecting said produce to elevated temperatures.

56. A method for treating produce to minimize browning upon subsequent processing, handling and storage comprising:
 exposing produce to a discoloration inhibitor selected from the group consisting of
 a) 0.2–0.5% cysteine and 0.05–0.1% sulfiting agent;
 b) 0.025–0.2% cysteine, 0.025–0.2% calcium chloride, and 0.025–0.2% sodium acid pyrophosphate; and
 c) 0.025–0.2% cysteine, 0.0001–0.0003% sulfiting agent, 0.025–0.2% calcium chloride, and 0.025–0.2% sodium acid pyrophosphate and subjecting said produce to elevated temperatures.

* * * * *